United States Patent [19]

Sawaya et al.

[11] Patent Number: 4,802,167
[45] Date of Patent: Jan. 31, 1989

[54] DATA MONITOR APPARATUS

[75] Inventors: Hajime Sawaya; Yoshinobu Fukuda; Hiroyuki Sato, all of Tokyo, Japan

[73] Assignee: Ando Electric Co., Ltd., Tokyo, Japan

[21] Appl. No.: 914,221

[22] Filed: Oct. 2, 1986

[30] Foreign Application Priority Data

Oct. 4, 1985 [JP] Japan .................................. 60-220295

[51] Int. Cl.$^4$ ..................... G01R 31/28; G06F 11/00
[52] U.S. Cl. ....................................... 371/25; 371/29
[58] Field of Search ................. 371/47, 25, 67, 68, 371/15, 29

[56] References Cited

U.S. PATENT DOCUMENTS

| | | | |
|---|---|---|---|
| 3,603,948 | 9/1971 | Medlinski | 371/15 |
| 3,725,880 | 4/1973 | Sachs | 371/15 |
| 3,805,038 | 4/1974 | Buedel et al. | 371/29 X |
| 4,158,193 | 6/1979 | D'Antonio | 371/47 |
| 4,395,755 | 7/1983 | Wakai | 364/200 |

Primary Examiner—Charles E. Atkinson
Attorney, Agent, or Firm—Flynn, Thiel, Boutell & Tanis

[57] ABSTRACT

A data monitor apparatus includes a comparator circuit (1) for comparing received data and reference data; a recorder circuit (3) for recording an output from said comparator circuit (1); a pointer control circuit (4) composed of a first counter (13A) responsive to a comparison result of the comparator circuit (1), a first setting unit (12A) for setting a remaining count value of the first counter (13A), a second counter (13B) responsive to a comparison result of the comparator circuit (1), a second setting unit (12)B) for setting a remaining count value of the second counter (13B); a selector (11) for accepting the received data as an input; a first pointer (14A) responsive to an output from the selector (11), and a second pointer (14B) responsive to an output from the selector (11); and a compressed data recorder circuit (5) composed of a first recorder circuit (15A) for recording the received data with use of the first pointer (14A) and a second recorder circuit (15B) for recording the received data with use of the second pointer (14B). With such arrangement, the received data and reference data are compared, and if there is any abnormality, only data in the vicinity of a portion of the data having the abnormality is recorded, whereby a troubled portion can be found with ease from the recorded data.

5 Claims, 2 Drawing Sheets

DATA MONITOR APPARATUS

BACKGROUND OF THE INVENTION

1. Field of the Invention

The invention relates to a data monitor apparatus in data communication for detecting specific data in received data by comparing the received data with reference data.

2. Description of the Prior Art

Data communication is adapted on the receiving side to compare received data with reference data and thereby detect no trouble if both are coincident but to detect trouble if both are not coincident.

However, the frequency of occurrence of such troubles is very low, i.e., only several times a day, and hence to know the time and the extent of any trouble of this type a lengthy investigation of a data record of received data is required.

SUMMARY OF THE INVENTION

In view of the drawbacks of the prior art, it is an object of the present invention to provide a data monitor apparatus capable of finding a troubled location of received data with ease in recorded data, by comparing the received data with reference data, and recording, when any abnormal point is found therein, only data around the abnormal point.

To achieve the above object, a data monitor apparatus according to the present invention includes a comparator circuit for comparing received data with reference data; a recorder circuit for recording an output from the comparator circuit; a first counter adapted to have a comparison result from the comparator circuit as an input; a first setting unit for setting a remaining count value of said first counter; a second counter adapted to have a comparison result from the comparator circuit as an input; a second setting unit for setting a remaining count value of the second counter; a selector adapted to received the received data as an input; a first pointer adapted to have an output from the selector as an input; a second pointer adapted to have the output from the selector as an input; and a compression data recorder circuit composed of a first recorder circuit for recording the received data with the aid of the first pointer and a second recorder circuit for recording the received data with the aid of the second pointer.

The above and other objects, features and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENT

An embodiment of a data monitor apparatus according to the present invention will be described with reference to the accompanying drawings.

Figure 2:
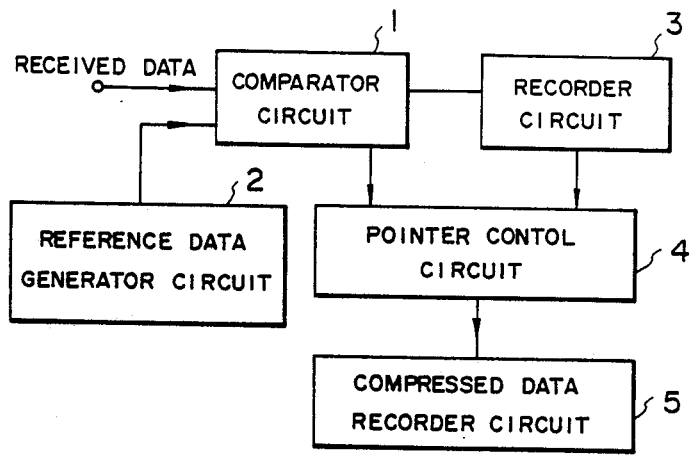
FIG. 2 is a block diagram of the embodiment according to the present invention.

As shown in FIG. 2, designated at 1 is a comparator circuit, 2 is a reference data generator circuit, 3 is a recorder circuit, 4 is a pointer control circuit, and 5 is a compressed data recorder circuit.

The comparator circuit 1, the reference data generator circuit 2, and the recorder circuit 3 are conventional devices, while the pointer control circuit 4 and the compressed data recorder circuit 5 are devices according to the present invention.

The comparator circuit 1 receives received data and reference data from the reference data generator circuit 2, and compares them with each other.

The recorder circuit 3 records an output from the comparator circuit 1.

Accordingly, a user can be informed of any trouble involved in the recorded data on the recorder circuit 3.

However, inasmuch as the data in recorder circuit 3 has been recorded for a long period of time and the frequency of occurrence of such troubles is very low, i.e., only several times a day, it is difficult to check troubled data by locating it in the recorded data.

To solve such problems, as described above a data monitor apparatus according to the present invention is adapted to have the pointer control circuit 4 into which an output from the comparator circuit 1 and an output from the recorder circuit 3 are entered, whereby the pointer control circuit 4 detects only received data involving any trouble by adjusting itself so as to permit certain received data to have located at the center thereof the troubled data, as described below, and delivers the data to the compressed data recorder circuit 5 which records the data delivered as such.

Thus, it is possible to know the existence of troubled data and the time when it is produced by examining the output from the compressed data recorder circuit 5.

In succession, the operation of the pointer control circuit 4 will be described in detail along with the compressed data recorder circuit 5 with reference to FIG. 1.

As shown in the figure, designated at 11 is a selector, 12A and 12B are each a setting unit, 13A and 13B are each a counter, 14A and 14B are each a pointer, and 15A and 15B are each a recorder circuit. The pointer control circuit 4 is composed of from 11 through 14A and 14B described above, while the compressed data recorder circuit 5 is composed of 15A and 15B.

Received data is entered into the selector 11 which transfers the received data to the pointer 14A or 14B with use of an output from the counter 13A or 13B.

The setting unit 12A is adapted to set a remaining count value for the counter 13A while the setting unit 12B is adapted to set a remaining count value for the counter 13B. How to determine those remaining count values will be described later.

The pointer 14A is adapted to permit the output from the selector 11 to be recorded on the recorder circuit 15A, while the pointer 14B is adapted to permit an output from the selector 11 to be recorded on the recorder circuit 15B.

The operation of the pointer control circuit and the compressed data recorder circuit will be described with reference to FIG. 1. The selector 11 in its first state is connected to a pointer 14A whereby a received data is delivered to the pointer 14A.

Thereupon, the received data is recorded on the recorder circuit 15A through the pointer 14A.

The comparator circuit 1, upon detecting a noncoincidence of the received data and the reference data as a result of their comparison, operates the counter 13A, whereby the setting unit 12A determines a remaining count value depending on a position at which the recorder circuit 15A records the output from the comparator circuit 1. How to determine the remaining count value will be described later.

When the remaining count value has been counted by the counter 13A, the selector 11 is switched by the output from the counter 13A to transfer the received data to the side of the pointer 14B. Hereby, the received data is recorded in succession on the recorder circuit 15B after data owing to the output from the comparator circuit 1 is recorded on the recorder circuit 15A. When a successive output from the comparator circuit 1 is applied to the counter 13B, the counter 13B counts a remaining count value starting at that time and then switches the selector 11 with use of the output therefrom to transfer the received data to the side of the pointer 14A.

Figure 1:
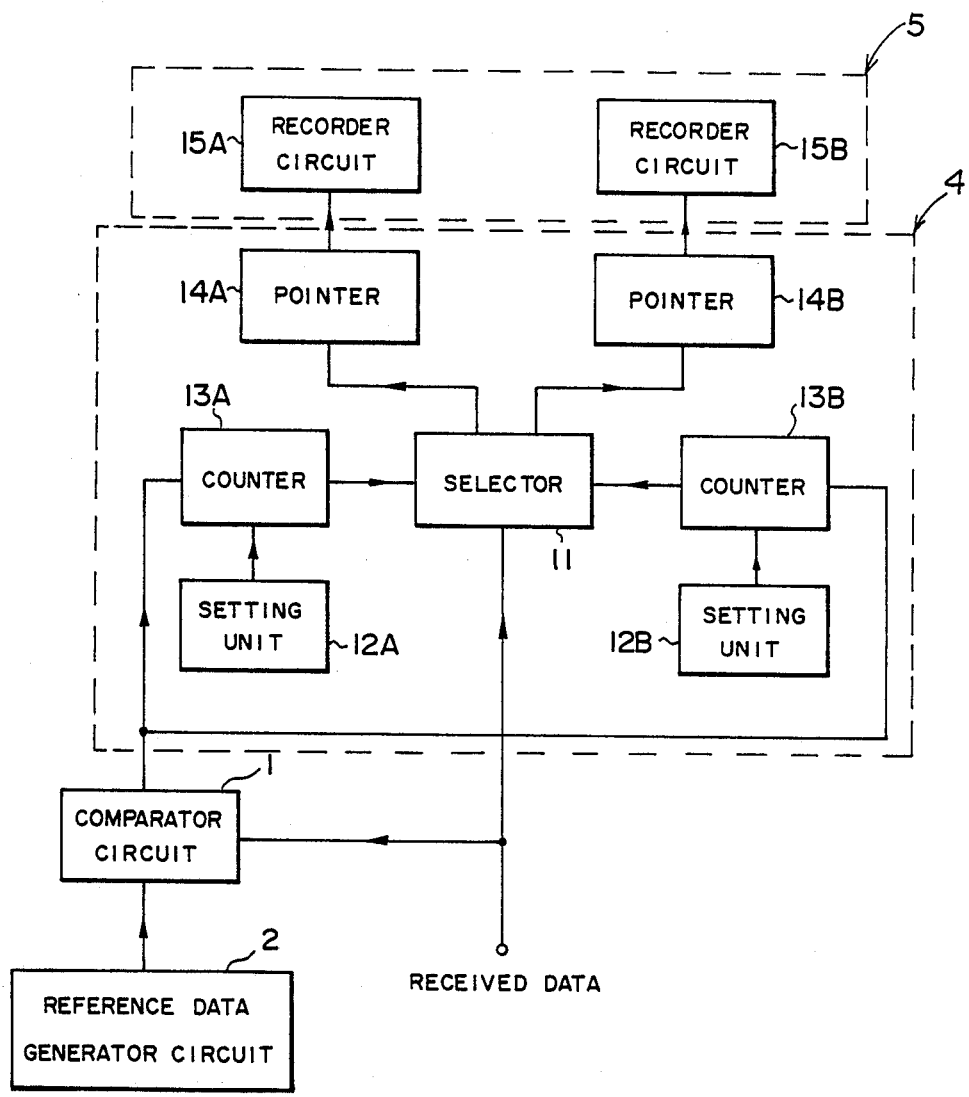
FIG. 1 is a block diagram of an embodiment of the present invention which includes a pointer control circuit 4 and a compressed data recorder circuit 5.

Namely, in FIG. 1, the counter 13A is operated due to the output from the comparator 1 to switch the selector 11 when the counter 13A counts up for successively recording the received data by allowing the recorder circuit 15A or 15B to successively record the data, if any, from the comparator circuit 1.

Figure 3:
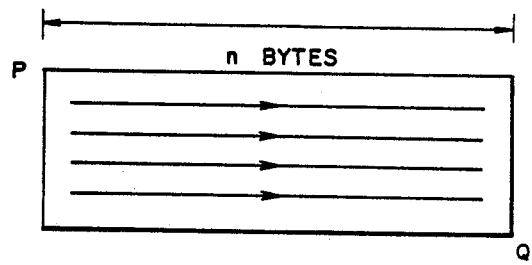
FIG. 3 is an illustration showing a memory area of a recorder circuit 15A.
Figure 4:
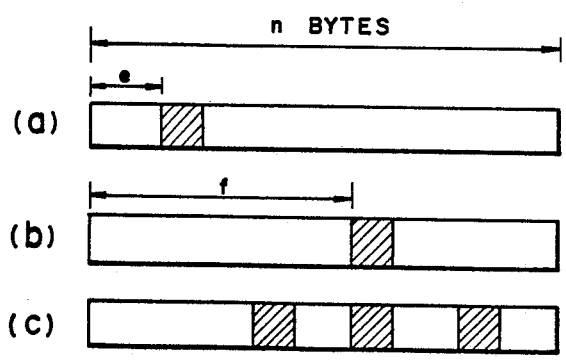
FIG. 4 is an illustration showing how to determine a remaining count value.

The following will describe how to determine the remaining count value with reference to FIGS. 3 and 4.

As shown in FIG. 3, data is recorded in a memory area of the recorder circuit 15A from an address P to an address Q thereof by circulating within sections having n bytes per section. Here, the arrangement of the recorder circuit 15B is adapted to be the same as that of the recorder circuit 15A.

FIG. 4(a) illustrates a state of the output from the comparator circuit 1 (indicating abnormal data) in recording received data in the recorder circuit 15A where the output lies at e bytes and forwardly of the center of the total n bytes, while FIG. 4(b) a state of the same located at f bytes and backwardly of the center of the total n bytes.

When the output from the comparator 1 appears at e bytes as shown in FIG. 4(a), the setting unit 12A sets a remaining count value of the counter 13A to (n−e).

Namely, when the output from the comparator 1 satisfies (n/2)>e and lies forwardly of the center of the n bytes, the remaining count value is assumed to be a remaining fraction of n bytes.

Provided the output of the comparator 1 appears at f bytes, the setting unit 12A sets the remaining count value of the counter 13A to n/2.

Namely, provided the output of the comparator 1 satisfies f>(n/2) and lies backwardly of the center of the n bytes, the remaining count value is assumed to be up to the center of the next n bytes. The arrangement is to enable the setting unit 12A to automatically set the remaining count value depending on the time at which the output from the comparator 1 appears while the recorder circuit 15A is recording received data.

The reason for determining the remaining count value as shown in FIG. 4 is as follows:

With any output from the comparator 1, the recorder circuit 15A continues to record received data by the prescribed number of bytes and then switches the selector 11, while the recorder circuit 15B records the received data provided thereafter.

With such arrangement, just the recorded data in the vicinity of any output from the comparator 1 can be taken out as compressed data.

In case of a successive output from the comparator 1, the setting unit 12A determines the remaining count value so as to permit certain received data, when there is produced the first output from the comparator 1 indicating such data is abnormal, to be located at the center of the n bytes.

With the remaining count value being set as shown in FIG. 4, just a troubled portion of the received data is recorded and retrieved with compression from a record in the recorder circuit 15A due to an output from the comparator circuit 1, whereby the time of occurrence of the trouble and conditions thereof can be examined.

According to the present invention, as described above, received data is recorded with use of the pointer control circuit and the compressed data recorder circuit, which permit the received data and reference data to be compared with each other, whereby the vicinity of the received data when any output is produced from the comparator can be recorded and hence many troubled positions in the received data can be found with ease from the recorded data.

Although a certain preferred embodiment has been shown and described, it should be understood that many changes and modifications may be made therein without departing from the scope of the appended claims.

What is claimed is:

1. A data monitor apparatus comprising:
   (a) reference data generator circuit means for generating reference data representing normal received data;
   (b) comparator circuit means for comparing actual received data with said reference data from said reference data generator circuit means, said comparator circuit means producing a signal when it detects a segment of the actual received data which deviates from said normal received data;
   (c) recorder circuit means for recording an output from said comparator circuit means;
   (d) a compressed data recorder circuit; and
   (e) pointer control circuit means cooperable with said compressed data recorder circuit and responsive to the occurrence of said signal from said comparator circuit means for causing said compressed data recorder circuit to store a portion of said actual received data which includes said segment thereof.

2. A data monitor apparatus according to claim 1, wherein said compressed data recorder circuit includes memory means for storing data, and wherein said pointer control circuit means includes:
   (a) a first counter having said signal from said comparator circuit means as an input;
   (b) first setting unit means for providing a remaining count value to said first counter, said first counter accepting said remaining count value in response to said signal from said comparator circuit means;
   (c) a second counter having said signal from said comparator circuit means as an input;
   (d) second setting unit means for providing a remaining count value to said second counter, said second counter accepting said remaining count value in response to said signal from said comparator circuit means;

(e) a selector having said actual received data as an input and having first and second outputs, said selector supplying said actual received data from its input to a selected one of its first and second outputs in dependence on output signals from said first and second counters;

(f) a first pointer circuit coupled to said compressed data recorder circuit and having said first output from said selector as an input, said first pointer circuit transmitting data from said first output of said selector to said memory means of said compressed data recorder circuit and specifying where in said memory means such data is to be stored; and (g) a second pointer circuit coupled to said compressed data recorder circuit and having said second output from said selector as an input, said second pointer circuit transmitting data from said second output of said selector to said memory means of said compressed data recorder circuit and specifying where in said memory means such data is to be stored.

3. A data monitor apparatus according to claim 2, wherein said compressed data recorder circuit includes:

(a) first recorder circuit means for recording said received data from said first pointer circuit, said first recorder circuit means including a first portion of said memory means; and (b) second recorder circuit means for recording said received data from said second pointer circuit, said second recorder circuit means including a second portion of said memory means.

4. A data monitor apparatus according to claim 2, wherein said first counter counts units of received data stored in said memory means by said first pointer circuit and produces said output signal thereof when, after accepting the remaining count value provided to it, it has counted a number of units of data equal to such remaining count value, wherein said second counter counts units of received data stored in said memory means by said second pointer circuit and produces said output signal thereof when, after accepting the remaining count value provided to it, it has counted a number of units of data equal to such remaining count value, and wherein said selector respectively selects its first and second outputs in response to said output signals from said second and first counters, respectively.

5. A data monitor apparatus according to claim 4, wherein each said portion of said actual received data stored in said memory means is n successive bytes thereof which immediately precede the output signal from one of said first and second counters; and wherein the remaining count value provided to said one of said counters is $n-x$ when $x<n/2$, and is $n/2$ when $x>n/2$, where x is the number of bytes of actual received data which were received between an immediately preceding output signal from the other of said counters and the next said signal thereafter produced by said comparator circuit means.

* * * * *